United States Patent [19]

Bohannan et al.

[11] Patent Number: 4,848,745

[45] Date of Patent: Jul. 18, 1989

[54] FIBER REINFORCED ARTICLE

[75] Inventors: John R. Bohannan; William H. Beever; J. Andrew Stirling, all of Bartlesville, Okla.

[73] Assignee: Phillips Petroleum Company, Bartlesville, Okla.

[21] Appl. No.: 870,477

[22] Filed: Jun. 4, 1986

[51] Int. Cl.$^4$ .............. A63B 59/06; A63B 59/00; B32B 5/12; B32B 5/08

[52] U.S. Cl. .................. 273/72 R; 273/67 R; 273/82 R; 273/DIG. 7; 273/DIG. 23; 428/105; 428/222; 428/377

[58] Field of Search ............... 273/DIG. 7, DIG. 23, 273/72 A, 82 R, 67 R, 72 R; 156/187, 327; 428/377, 419, 392, 395, 366, 375, 105, 106, 108, 109, 110, 112, 113, 114, 222

[56] References Cited

U.S. PATENT DOCUMENTS

| | | | |
|---|---|---|---|
| 2,804,400 | 8/1957 | Kelly et al. | 273/82 R |
| 2,828,798 | 4/1958 | Hopkins et al. | 156/187 |
| 3,709,754 | 1/1973 | Medler | 156/187 X |
| 3,813,098 | 5/1974 | Fischer et al. | 273/DIG. 7 X |
| 3,850,156 | 11/1974 | Eicholtz | 273/DIG. 23 X |
| 3,959,544 | 5/1976 | Rogers | 273/DIG. 23 X |
| 4,000,896 | 1/1977 | Lauraitis | 273/80 R |
| 4,023,801 | 5/1977 | Van Auken | 273/DIG. 7 X |
| 4,092,025 | 5/1978 | Yanagioka | 273/72 R |
| 4,097,626 | 6/1978 | Tennent | 428/112 X |
| 4,128,963 | 12/1978 | Dano | 273/DIG. 7 X |
| 4,131,701 | 12/1978 | Van Auken | 273/DIG. 23 X |
| 4,133,708 | 1/1979 | Tokuno | 273/DIG. 23 X |
| 4,135,035 | 1/1979 | Branen et al. | 273/DIG. 23 X |
| 4,157,181 | 6/1979 | Cecka | 273/DIG. 23 X |
| 4,157,273 | 6/1979 | Brady | 428/419 X |
| 4,172,175 | 10/1979 | Pearson et al. | 273/DIG. 23 X |
| 4,214,021 | 7/1980 | Blackwell | 428/419 |
| 4,351,786 | 9/1982 | Mueller | 264/46.7 |
| 4,457,511 | 7/1984 | Witkowski | 273/82 R |
| 4,469,733 | 9/1984 | Seddon | 428/109 |
| 4,489,129 | 12/1984 | Schue et al. | 428/367 X |
| 4,506,887 | 3/1985 | Trysinsky | 273/73 F |
| 4,541,629 | 9/1985 | Witkowski | 273/72 R |
| 4,569,710 | 2/1986 | Lambot et al. | 156/187 X |
| 4,591,155 | 5/1986 | Adachi | 273/DIG. 23 X |
| 4,621,980 | 11/1986 | Reavely et al. | 428/105 X |
| 4,677,020 | 6/1987 | Takagi et al. | 428/377 X |
| 4,758,458 | 7/1988 | Schutze | 428/113 |

FOREIGN PATENT DOCUMENTS

| | | | |
|---|---|---|---|
| 1072996 | 3/1980 | Canada | 273/72 R |
| 63976 | 5/1977 | Japan | 428/419 |
| 1261541 | 1/1972 | United Kingdom | 273/DIG. 23 |

OTHER PUBLICATIONS

*Tulsa World*, Oct. 6, 1985, Business Section—Phillips Petroleum's Plans to Develop a Plastic Bat.

Modern Plastics, Jul. 1985, p. 38, "Graphite-Reinforced Alloy Makes Strong, Light Ball Bat".

Plastics Design Forum., Jul./Aug. 1985, p. 23, "Update, The 'Crack' is Back".

*Primary Examiner*—Randolph A. Reese
*Assistant Examiner*—John A. Ricci
*Attorney, Agent, or Firm*—A. W. Umphlett

[57] ABSTRACT

A filament winding process is disclosed for producing articles having a layer of wound helically extending fibers sandwiched between generally longitudinal fibers. The process is well adapted for use with thermoplastic resins and for producing articles having a high resistance to bending. In a preferred embodiment, there is disclosed a filament wound baseball bat formed from a thermoplastic resin, poly(arylene sulfide).

18 Claims, 2 Drawing Sheets

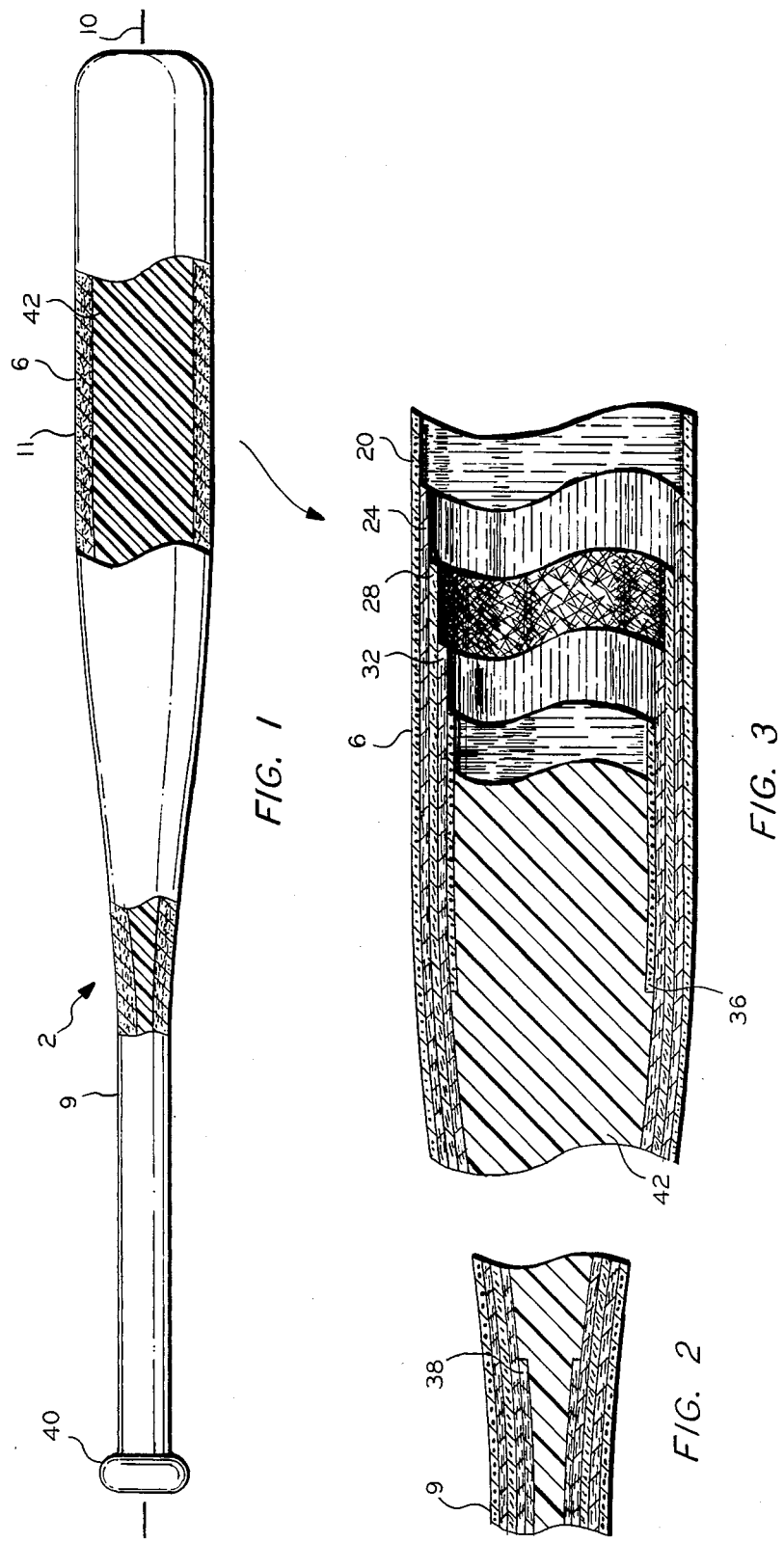

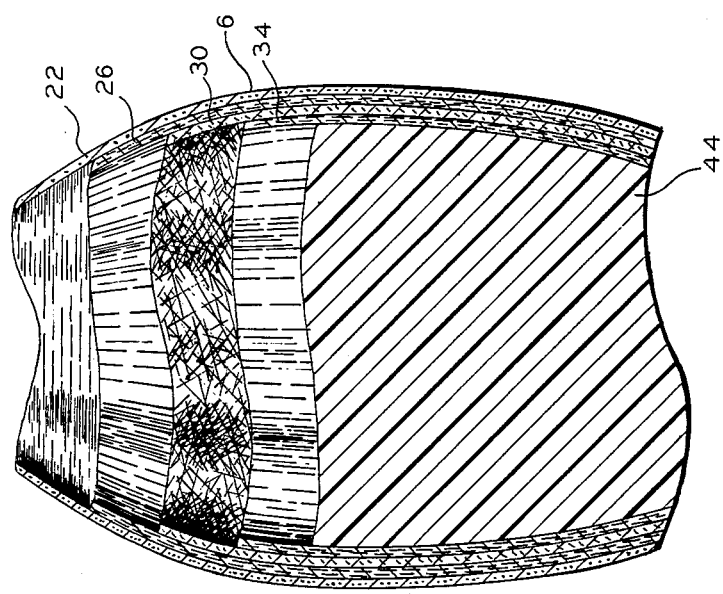
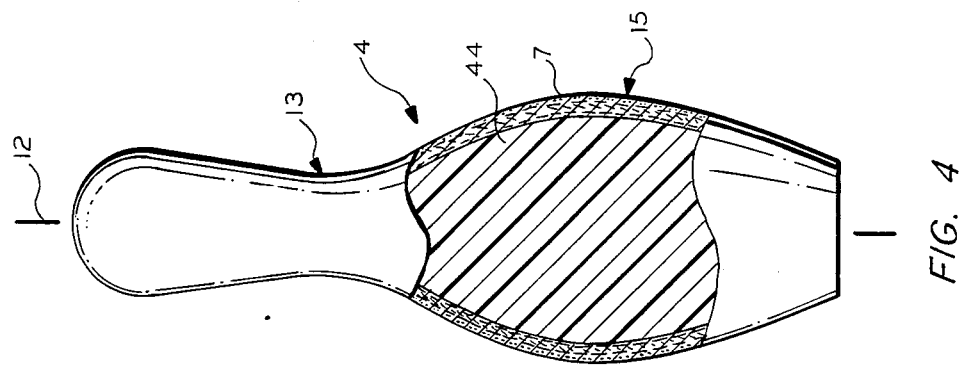

FIBER REINFORCED ARTICLE

BACKGROUND OF THE INVENTION

In one aspect, this invention relates to a fiber reinforced plastic article. In another aspect, the invention relates to a process for forming a fiber reinforced plastic article.

Sporting goods such as baseball bats and bowling pins have traditionally been formed from wood. However, wood is not an entirely satisfactory material of construction for articles such as these. Both bats and bowling pins are subject to splintering when struck at high speed. Furthermore, a bat formed from wood has a relatively small, less than 0.1 inch, "sweet spot", where contact with a ball will result in maximum energy transfer. In a bat, the sweet spot can be made larger by shifting the center of gravity toward the handle end of the bat. However, the center of gravity can be shifted only a limited amount with wood prior to the bat's strength dropping off to dangerously low levels. With synthetics, the center of gravity can be shifted a great deal more and the bat can be made longer as well, up to 42 inches, to provide a "sweet spot" of over 3 inches. The performance and durability of some sporting goods thus can be dramatically improved by construction with fiber reinforced plastics.

OBJECTS OF THE INVENTION

It is an object of this invention to provide an article formed from a fiber reinforced plastic.

It is another object of this invention to provide a filament wound article where the filaments are embedded in a continuous plastic matrix.

It is a still further object of this invention to provide a filament wound baseball bat.

It is yet another object of this invention to provide a method for forming tubular objects from fiber strands containing a thermoplastic resin.

SUMMARY OF THE INVENTION

In a first embodiment, the invention is directed toward an article which is characterized by a laminated outer shell of layers of fiber reinforcement the fibers of which are embedded in a continuous matrix of a thermoplastic resin.

In another aspect, the invention is directed to a filament wound baseball bat.

In still another aspect, the invention relates to a thermoplastic baseball bat formed by a filament winding process.

In a still further aspect, there is provided a method for forming a tubular object such as bowling pin or a baseball bat by a filament winding process. According to the process, some of the fibers in the article are made to extend longitudinally along the article. This procedure imparts a high resistance to bending in planes transverse to the longitudinal axis of the article, a characteristic highly desirable in a baseball bat, for example. When the longitudinally extending strands comprise fibers impreganted with thermoplastic resin deposited on a suitable support, the strands can be tacked into position by the localized application of heat. The strands can be consolidated by the application of radial pressure and sufficient heat to cause the resin to flow to provide the finished or semi-finished article. By selecting a tough thermoplastic resin to serve as the matrix material, articles requiring a great deal of impact resistance, such as bowling pins, can be produced.

BRIEF DESCRIPTION OF THE DRAWINGS

FIG. 1 depicts a baseball bat embpdying certain features of the present invention.

FIG. 2 illustrates a portion of the baseball bat of FIG. 1 illustrating additional details.

FIG. 3 illustrates a portion of the baseball bat of FIG. 1 illustrating additional details.

FIG. 4 depicts a bowling pin embodying certain features of the present invention.

FIG. 5 depicts in greater detail a portion of the bowling pin shown in FIG. 4.

DETAILED DESCRIPTION OF THE INVENTION

FIGS. 1 and 4 illustrate articles formed according to certain aspects of the invention. In FIG. 1, there is illustrated a baseball bat called out by the numeral 2. In FIG. 4, a bowling pin is called out by the numeral 4. Each of these articles is characterized by a laminated outer shell 6 or 7, respectively, of fiber reinforcement impregnated in a continuous resin matrix. Preferably, the matrix comprises a thermoplastic resin because thermoplastic resins are generally tougher than thermoset resins. Shell thickness generally is between about 0.1 and 0.5 inches, usually 0.2-0.3 inches. In a preferred embodiment, the resin comprises a poly(arylene sulfide) resin, of which the most preferred resin is a poly(phenylene sulfide), most preferably a poly(phenylene sulfide) resin having a melt flow in the range of 50-200 g/10 min. FIGS. 2, 3 and 5 illustrate the layers forming the outer shells 6 and 7 in greater detail.

Preferably, the shell 6 or 7 is formed from a plurality of at least three layers containing fiber reinforcement. Generally, the fibers of the fiber reinforcement are long fibers selected from the group consisting of glass fiber, boron fiber, carbon fiber and aramid fiber, since these materials are well suited and commercially available. By long is meant having a fiber length in the range of 0.1–10 m and beyond, preferably so called "continuous" fibers. Bundles of continuous fibers are usually called rovings and are most preferred. Where weight and stiffness are not overriding considerations, glass roving is the preferred fiber because it is cheap. Where light weight is of prime concern, aramid fiber roving may be a better choice. Where high stiffness is a prime requirement, carbon fiber roving may offer the best property balance, although it is at present of highest cost of the above-enumerated fibers.

Each of the articles of FIGS. 1 and 4 has a longitudinal axis 10 or 12, respectively, and is of generally circular cross-section in a plane normal to the longitudinal axis. The bat of FIG. 1 has a neck portion 9 and a body portion 11 positioned along the longitudinal axis 10. The bowling pin 4 also has a neck portion 13 and a body portion 15 positioned along the longitudinal axis 12. Preferably, the shell 6 comprises at least three layers each of which contains fiber reinforcement. The fibers in adjacent layers are generally set at an angle to each other, so that the layers are laminated. More preferably, the shell 6 comprises at least one layer of generally circumferentially extending rovings 20 in FIG. 3, 22 in FIG. 5; at least one layer of generally longitudinally extending rovings 24 in FIG. 3, 26 in FIG. 5; and at least one layer of generally helically extending rovings 28 in FIG. 3, 30 in FIG. 5.

In one embodiment of the invention, a layer containing helically extending rovings 28 or 30 is sandwiched between two layers containing longitudinally extending rovings. In FIG. 3, the layer 28 is sandwiched between layers 32 and 24 containing generally longitudinally extending rovings.

The generally circumferentially extending rovings 20 or 22 form an angle of near 0° with respect to a plane which is normal to the longitudinal axes 10 or 12. The circumferential rovings are positioned preferably by filament winding on previously depsosited longitudinal rovings 24 or 26, respectively. Of course, the angle of the generally circumferentially extending rovings must be greater than 0° in order for the winding to progress but it is preferably near 0°. When the resin with which the fibers in layer 20 are impregnated is a thermoplastic resin it is desirable that the layer be put down in the form of impregnated tape or roving at a temperature above the softening temperature of the resin. This can be accomplished by running a heated iron or roller over the roving after deposit in a pre-softened form. Further consolidation with the previously deposited layer 24 at a subsequent time by the application of sufficient heat and pressure is desirable.

The generally longitudinally extending rovings in layers 24 and 26, respectively, will usually lie generally in planes which include the longitudinal axes 10 or 12 of the article. The generally longitudinally extending strands provide a tubular layer of reinforcement preferably impregnated in a continuous thermoplastic resin matrix. The strands are usually tacked in position on a support layer laid down in a preceding step, here the helical layers 28 or 30, and then tacked into position by the localized applicatin of heat sufficient to melt the impregnating resin. The longitudinal strands are subsequently consolidated together and onto the support by the application of radial pressure with respect to the longitudinal axes 10 and 12 and sufficient heat to melt the resin. Consolidation can be partly accomplished by wrapping the circumferential rovings in layers 20 or 22 under tension and elevated temperatures. The rovings in the layers 28 and 30 of helically extending roving generally form an angle from near 0° to near 90° with respect to a plane normal to the longitudinal axes 10 or 12 of the article. Usually, the rovings will form an angle of between about 20° and 70° with a plane normal to the longitudinal axis of the article. Greater modulus or resistance to bending in planes transverse to the longitudinal axis of the article can be provided by having the rovings extend in a more longitudinal direction, that is, forming an angle with the plane normal to the axis which is closer to 90°. The article can be provided with greater resistance to crushing by having the rovings in the helical layer extend more near circumferentially with respect to the article, that is, forming an angle more near 0° with respect to the longitudinal axis of the aritcle. Generally, the fibers in the at least one layer of helically extending rovings will extend in a first direction and a second direction, the rovings extending the first direction crossing the plane normal to the axis at an angle of about $+\theta$, the rovings extending in the second direction crossing the plane normal to the axis of the article at an angle of about $-\theta$, $\theta$ will generally be from near 0° to near 90°, usually between about 20° and about 70°. In one embodiment of the invention, the rovings in the layers 28 and 30 are woven or braided together so that rovings oriented at about $+\theta$ and about $-\theta$ are present in the same layer. However, the layers having the helically extending fibers can be separate layers if desired.

In a further embodiment of the invention, the article can be provided with at least one additional layer of generally circumferentially extending rovings in the body portion 11 or 15 and/or at least one additional layer of generally longitudinally extending rovings in the neck portion 9 or 13. For example, in FIG. 3, an additional layer 36 of generally circumferentially extending rovings is provided in the body portion 6. Further, in FIG. 2 at least one additional layer 38 containing generally longitudinally extending rovings is provided in the neck portion 9. In the interest of light weight and low expense, the at least one additional layer of rovings in the neck portion 9 or 13 need not form a substantially complete layer in the body portion 11 or 15 and the at least one additional layer in the body portion 11 or 15 need not form a substantially complete layer in the neck portion 9 or 13. The preferred additional layers extend along only a portion of the article. In the embodiment of FIG. 2 the layer 38 containing the generally longitudinally extending fibers provides the neck portion with additional stiffness or modulus. In the embodiment of FIG. 3 the layer 36 containing the generally circumferentially extending fibers provides the body portion with greater resistance to crushing. Where at least a portion of the fibers in the layers 38, 32, 24, 26 or 34 which contain generally longitudinally extending rovings comprise carbon fiber, the completed article will have high resistance to bending. Where the fibers of these layers comprise aramid fibers the completed article will have good resistance to bending and somewhat lighter weight. By concentrating lightweight aramid or carbon fibers in the body portion and relatively dense glass fibers in the neck portion, the center of gravity in the completed article can be shifted toward the neck. E glass roving has been used with good results in all layers. The articles 2 and 4 can be provided with additional resistance to crushing as well as further modified in their center of gravity by filling such as with a cured closed cell foam material 42 or 44 respectively. Preferably, a polyurethane foam is used. By selectively filling the shells 6 or 7 with foam, the center of gravity of the article can be modified significantly.

A knob 40 can be provided on the end of the neck portion 9 of the bat relatively easily where the device is formed by a filament winding process by concentrating helical and/or circumferential rovings at the desired location. The same technique can be used to form the head on the bowling pin. Generally, filament winding is applicable to the formation of most any tubular member having a longitudinal axis. Where the article is to be formed from a thermoplastic resin, generally longitudinally extending rovings or strands of fibers impregnated with the thermoplastic resin can be placed on a suitable support and tacked into position with respect to the support by the localized application of heat sufficient to melt the resin. The support can be a mandrel, for example, usually formed from a metal such as steel and treated with a suitable release agent or a previously deposited layer or layers of generally circumferentially or helically extending strands. The mandrel should be tapered to permit easy removal from the finished article. The strands or rovings generally contain 50–75 wt % fiber, the balance being resin. Lightweight (low density) fibers tend to be used in the lower end of the range, while high density fibers tend to be used in the upper end of the range. The thus deposited strands or rovings are consolidated by the applicatin of radial pressure and sufficient heat to cause the resin to flow. The required pressure depends on temperature. At temperatures in the range of 0°–100° F. above the melting point of the polymer (generally 525°—625° F. for poly(arylene sulfides), in the range of 1 to 150 psig can effect consolidation. Where the article contains helically or circumferentially extending strands the interior of the article can be pressurized in order to provide sufficient pressure for consolidation.

The strands are generally impregnated prior to being wound or, in the case of longitudinally extending fibers, tacked into position. Where a thermoplastic resin is employed, the strands can be impregnated by passage through a melt, a solution, or a slurry containing the resin. The strand is wound onto the article at a temperature a few degrees over the softening point of the resin and is generally under a tension of a few pounds. A heated shoe can be dragged over the article surface to preheat the substrate and iron the strand being wound into the substrate. A good finish is thus attainable which can be further improved by the application of a tough finish coat if desired.

That which is claimed is:

1. A filament wound article having a longitudinal axis, and a body portion and a neck portion positioned along the longitudinal axis, said filament wound article characterized by a laminated outer shell of layers of fiber reinforcement in the form of fiber rovings impregnated in a continuous resin matrix, said laminated outer shell being characterized by a layer of generally helically extending rovings of said fiber reinforcement which form an angle of from near 0° to near 90° with a plane normal to the longitudinal axis of the filament wound article sandwiched between at least two layers of rovings of said fiber reinforcement lying generally in planes which include the longitudinal axis of the article.

2. Article as in claim 1 further characterized by a foam core filling the outer shell.

3. Article as in claim 2 wherein the resin comprises a poly(arylene sulfide).

4. Article as in claim 2 wherein the fiber reinforcement is selected from the group consisting of glass fiber, boron fiber, carbon fiber and aramid fiber and the resin matrix comprises a thermoplatic resin.

5. Article as in claim 4 further characterized by generally circular cross section in a plane normal to said longitudinal axis and at least one layer of generally circumferentially extending rovings as the outermost layer of fiber reinforcement in the outer shell.

6. Article as in claim 5 wherein the generally circumferentially extending rovings form an angle of near 0° with respect to a plane normal to the longitudinal axis of the article; wherein the generally longitudinally extending rovings lie generally in planes which include the longitudinal axis of the article.

7. Article as in claim 6 wherein the at least one layer of generally helically extending rovings comprises rovings which cross a plane normal to the longitudinal axis of the article at about $+\theta°$ and rovings which cross the plane normal to the longitudinal axis at about $-\theta°$, where $\theta$ is an angle of between about 20° and about 70°.

8. Article as in claim 6 further characterized by at least one additional layer of longitudinally extending rovings of said fiber reinforcement in the neck portion of the article.

9. Article as in claim 8 wherein the at least one additional layer of rovings of said fiber reinforcement in the neck portion does not form a substantially complete layer in the body portion.

10. Article as in claim 6 further characterized by at least one additional layer of generally circumferentially extending rovings of said fiber reinforcement in the body portion of the article.

11. Article as in claim 10 wherein the at least one additional layer of rovings of said fiber reinforcement in the body portion does not form a substantially complete layer in the neck portion.

12. Article as in claim 6 wherein the rovings in the layer of generally helically extending rovings of said fiber reinforcement are woven or braided together.

13. Article as in claim 6 wherein the core comprises a cured foam polymeric material at least partially filling the shell.

14. Article as in claim 6 having an exterior surface resembling a baseball bat.

15. Article as in claim 6 having an exterior surface resembling a bowling pin.

16. Article as in claim 6 wherein at least a portion of the generally longitudinally extending rovings comprise carbon fiber.

17. Article as in claim 6 wherein at least a portion of the generally longitudinally extending rovings comprise aramid fibers.

18. Article as in claim 2 wherein the resin matrix comprises a poly(arylene sulfide) resin and the layers of fiber reinforcement comprise rovings of glass fiber.

* * * * *

UNITED STATES PATENT AND TRADEMARK OFFICE
CERTIFICATE OF CORRECTION

PATENT NO. : 4,848,745

DATED : July 18, 1989

INVENTOR(S) : John R. Bohannan, William H. Beever, J. Andrew Stirling and James E. O'Connor It is certified that error appears in the above-identified patent and that said Letters Patent is hereby corrected as shown below:

> On the title page, item [75], insert:
> The name of inventor "James E. O'Connor", which was omitted from the Certificate of Letters Patent.

Signed and Sealed this

Twenty-fifth Day of December, 1990

*Attest:*

HARRY F. MANBECK, JR.

*Attesting Officer*     *Commissioner of Patents and Trademarks*